March 15, 1949. G. B. HILL 2,464,684
BALING PRESS
Original Filed Dec. 17, 1943 4 Sheets-Sheet 1

INVENTOR.
GEORGE B. HILL
BY
ATTORNEYS

March 15, 1949. G. B. HILL 2,464,684
BALING PRESS

Original Filed Dec. 17, 1943 4 Sheets-Sheet 4

INVENTOR.
GEORGE B. HILL
ATTORNEYS

Patented Mar. 15, 1949

2,464,684

UNITED STATES PATENT OFFICE 2,464,684

BALING PRESS

George B. Hill, Ottumwa, Iowa, assignor to Deere Manufacturing Co., a corporation of Iowa Original application December 17, 1943, Serial No. 514,707. Divided and this application February 12, 1945, Serial No. 577,579

13 Claims. (Cl. 100—25)

1

The present invention relates generally to baling presses and has for its principal object the provision of a novel and improved baling press of the type which picks up a windrowed crop, feeds the crop material into the press, automatically ties each bale when it reaches the desired size, and finally discharges the tied bales, no operator being required in attendance except for the operator who drives and steers the tractor or other draft device along the windrow.

This application is a division of my copending application, Serial No. 514,707, filed December 17, 1943.

Another object of my invention relates to the provision of a pick-up baling press which is more compact and efficient than those heretofore known in the art. More specifically an object of my invention relates to the provision of novel and improved means for collecting and conveying crops to the baling chamber with a minimum of handling and by the most direct and shortest path of travel. In the accomplishment of this object, the bale case is positioned transversely of the direction of travel of the implement and a pick-up device ahead of the bale case delivers the crops rearwardly directly into the baling chamber through an opening in the front wall thereof. This arrangement involves a single conveyor without the necessity for a cross conveyor, and the single conveyor is of minimum length for it is not required to lift the crops to the top of the bale case as in some prior art devices.

A further object relates to the provision of a baling press having a novel and improved feeding device for feeding the material into the bale case in a positive manner and which is adjustable for different crop conditions and different materials to be baled, so that the material is well distributed within the bale case, with the result that a bale of uniform density is formed. More specifically, an object of the present invention relates to the provision of a feeding device which travels into the feed opening of the bale case through slots in the wall of the latter and moves the baleable material into the bale case toward the wall opposite the feed opening, after which the feeding device is retracted from the case through the slots in the wall thereof. In the accomplishment of this object, a feeder fork has been provided which is movably mounted on the bale case for movement in a closed path in which the fork plunges downwardly into the material in front of the feed opening, then moves the material into the bale case through the feed opening, the feeder fork extending through slots in the wall of the

2 bale case, and is then retracted outwardly through the slots and returned to the initial position. When material is being supplied in large quantities, the amount moved by the fork at each stroke is comparatively large and therefore it is desirable to retract the fork from the bale case before the fork has traveled a major part of the width of the case in order to avoid crowding the material into the side of the case opposite the feed opening. On the other hand, when material is being supplied to the feeder at a slow rate, it is desirable that the feeder fork travel across a greater portion of the width of the bale case in order to insure that the material is fed to the side of the case opposite the feeder opening. Therefore, it is a further object of the present invention to provide a feeder which can be adjusted to move across the bale case to various positions therein before being retracted through the slots in the side of the case.

These and other objects and advantages of the present invention will be apparent to those skilled in the art after a consideration of the following description, in which reference is had to the drawings appended hereto, in which Figure 1 is a plan view of a windrow pick-up baling press embodying the principles of my invention.

Figure 1:
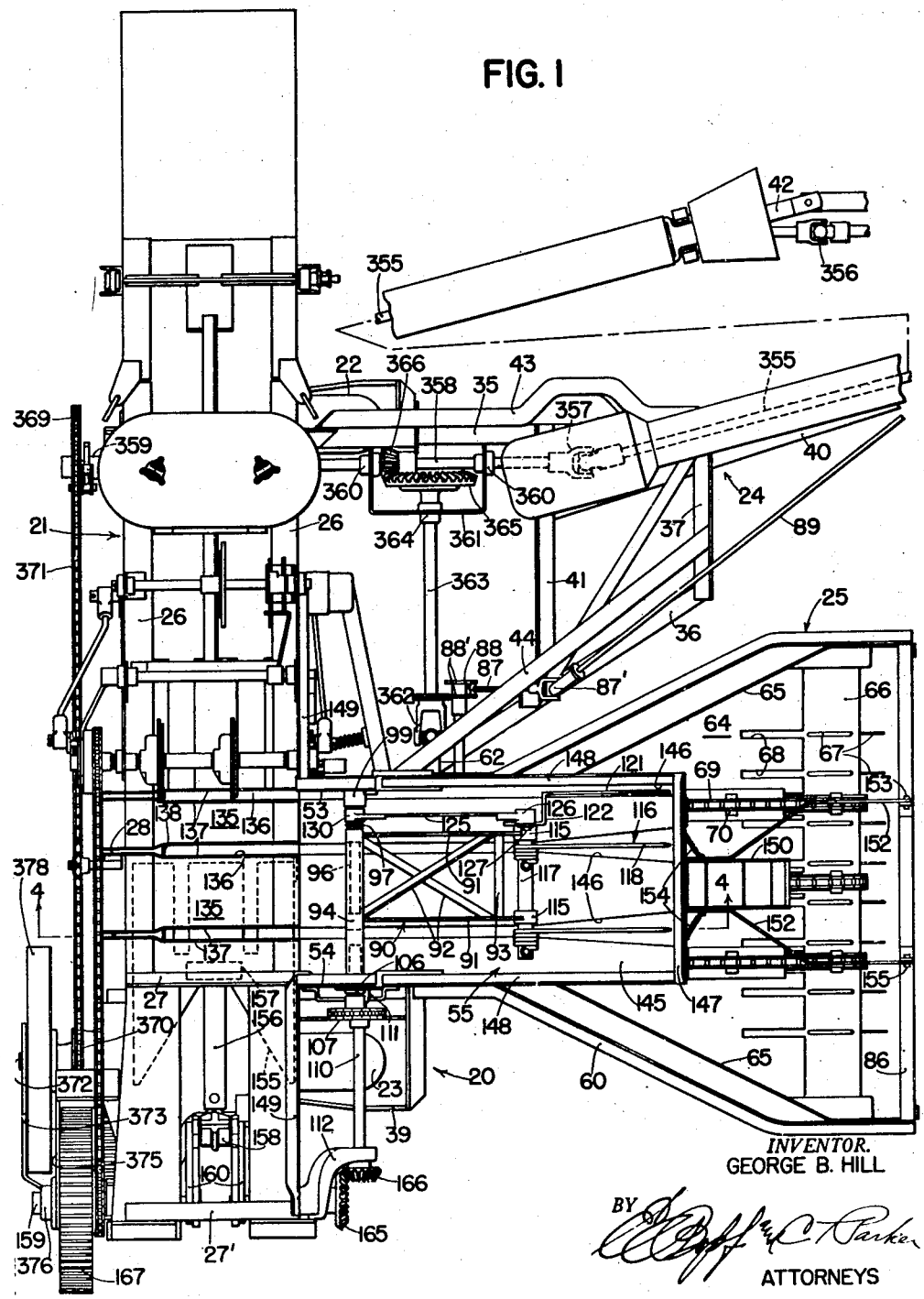

Referring now to the drawings, the automatic pick-up press is indicated in its entirety by reference numeral 20 and comprises, in general, a transversely disposed bale case 21 mounted on a pair of laterally spaced supporting wheels 22, 23, on which it is drawn forwardly by means of a draft member 24 extending forwardly from one side of the machine, while a pick-up device 25 extends forwardly from the other side of the machine for picking up windrowed crops and feeding them to the bale chamber, as will be explained.

The bale case 21 is rectangular in cross section and comprises four structural angle members 26 disposed transversely of the direction of advance and defining the corners of the bale case. The angle members 26 are tied together by suitable horizontal and vertical frame members 27, 28 to form a rigid structure.

The bale case is mounted on the wheels 22, 23 by means of depending supports 30, 31, respectively, on which the axles 32, 33 of the wheels are mounted. The supports 30, 31 are in the form of U-shaped structural members, which also serve to tie the front and rear lower angle members 26 together. It will be noted in Figure 2 that the wheels are mounted beneath the bale case and slightly forwardly of the transverse center line thereof, whereby the weight of the machine is nearly balanced on the axles, the latter being sufficiently spaced behind the center of gravity so that the forward end of the draft member 24 always imposes a nominal load on the drawbar of the tractor, on which it is supported, so that there is never any tendency when travelling up-hill, to exert a lifting force on the tractor.

The draft frame 24 comprises a pair of structural beams 35, 36 connected together by a transverse frame member 37 at their forward ends and diverging rearwardly therefrom. The beam 35 is connected at its rear end to a U-shaped frame member 38, the latter being disposed substantially horizontally and straddling the wheel 22 to interconnect the two depending supports 30 at opposite ends of the axle 32. The beam 36 is connected to a similar U-shaped frame member 39, which inter-connects the supports 31 on opposite sides of the wheel 23. A draft tongue 40 is secured to the transverse member 37 and to a second transverse member 41 spaced rearwardly thereof, and the tongue extends forwardly and is provided at its forward end with a hitch device 42, by means of which the tongue is connected to and supported on the drawbar of a tractor. The draft frame 24 is braced against vertical displacement relative to the bale case 21 by means of a pair of diagonal bracing members 43, 44, which are bolted to the upper portion of the bale case at laterally spaced points and converge forwardly and downwardly and are fixed at their forward ends to the transverse frame member 37.

The front and back walls of the bale case 21 comprise vertical metal sheets 51, supported between the upper and lower main structural members 26. In the front of the bale case is provided a feed opening 52. A pair of vertical walls 53, 54 extend forwardly from the bale case on opposite sides of the opening to serve as lateral guides for material being fed to the opening 52, and the walls extend upwardly above the bale case for the purpose of supporting a feeder, indicated generally by reference numeral 55, which will be described in detail later. A floor plate 56 extends horizontally between the walls 53, 54 along the lower edge of the opening 52, over which the feeder 55 is adapted to sweep the material to be baled. The material is delivered to the floor plate 56 by means of the pick-up device 25 which is in the form of a harvester platform and which is mounted on the walls 53, 54 and extends forwardly and downwardly therefrom. The harvester platform 25 comprises a supporting frame 60 having a pair of laterally spaced brackets 61 (see Figure 2) which are journaled on a transverse shaft 62, the latter being journaled for rotation in bearings 63 fixed to the side walls 53, 54. The details of the platform are fully disclosed and claimed in my Patent No. 2,347,907, issued May 2, 1944 and therefore a detailed description here is not considered necessary.

Briefly, the platform 25 comprises a floor plate 64 and forwardly diverging side walls 65 and a pick-up cylinder 66, mounted transversely across the forward end of the platform and having crop engaging fingers 67 which rotate upwardly and rearwardly, laying the harvested crop upon the floor plate 64, the latter being slotted at 68 to receive the pick-up fingers 67. The cylinder 66 is driven by a plurality of chains 69, which extend upwardly over the floor plate 64 from the cylinder 66 and have crop engageable fingers or lugs 70 for moving the crops received from the pick-up cylinder 66 upwardly and rearwardly over the floor plate 64 and delivering the crops to the floor plate 56 at the mouth of the feed opening 52. At the upper end of the platform 25, the chains 69 are trained over a plurality of sheaves or pulleys 71, which are fixed to the shaft 62 and are driven thereby. The chains 69 return beneath the floor plate 64 to the pick-up cylinder 66.

The platform 25 is counterbalanced by a pair of tension springs 75 connected to a transverse frame member 76, which is fixed to the draft member 36 and to the frame member 39. The springs 75 are connected to a pair of vertically disposed lever arms 77, respectively, which are pivotally mounted at 78 on brackets 79 attached to vertical legs 80, which extend downwardly from the two side walls 53, 54 and are mounted on a transverse frame member 81, which is supported at its outer end on the U-shaped frame member 39 and extends laterally inwardly to the draft member 36. The lower ends of the lever arms 77 are pivotally connected to horizontal links 82, which extend forwardly to pivots 83 on a transverse frame member 84 which interconnects the rear sides of a pair of laterally spaced ground engageable runners 85.

The runners 85 and side walls 65 are interconnected by an upwardly arched bracing member 86. The platform 25 is raised and lowered about the axis of the shaft 62 by means of a threaded rod 87 which is threaded into a trunnion nut 88 supported between a pair of spaced arms 88' fixed to the transverse shaft 78 on which the lever arms 77 are fixedly mounted. The threaded shaft 87 is rotated by means of a control shaft 89 connected to the shaft 87 through a universal joint 87'. The shaft 89 extends forwardly to a suitable support 89' on the draft tongue 40 and is provided with a suitable handle for rotating the shaft 89, thereby screwing the threaded shaft 87 into or out of the nut 88.

The feeder 55 comprises a frame 90 including a pair of laterally spaced arms 91 interconnected by crossed braces 92 and by a transverse brace 93. The arms 91 are rigidly mounted on a transverse support comprising a pair of spaced bars 94. A pair of bearing sleeves 95 are rigidly mounted between the bars 94 and are disposed in axial alignment to receive a support shaft 96. The shaft 96 is rigidly fixed to the end of a supporting arm 97 at the inner end of the shaft 96. The arm 97 depends from and is fixed to a shaft 98 which is rigidly supported in a hub 99 carried on the upper end of a bracket arm 100 that is pivotally mounted on the vertical side wall 53 by means of a bolt 101 which is coaxial with the shaft 96 on which the feeder 90 is journaled. The pivoted arm 100 may be swung about the axis of the bolt 101 without shifting the position of the supporting shaft 96 except in angular movement about the axis thereof. The arm 100 can be rigidly fixed in adjusted position by means of a bolt 102 extending through the arm 100 and through an arcuate slot 103 in the side wall 53, the slot 103 being curved about the axis of the bolt 101 as a center. The purpose for this adjustment will be made apparent later.

The bars 94 converge slightly beyond the end of the supporting shaft 96 and are rigidly fixed to a stub shaft 105, as by welding, and the stub shaft 105 is journaled in a bearing 106 at the upper end of the side wall 54, extending therethrough to support a sprocket wheel 107 on the outer end of the shaft 105. The sprocket 107 is driven by a drive chain 108 which is trained around a second sprocket 109 fixedly mounted on a drive shaft 110, the latter being rotatably mounted in a bearing 111 fixed to the side wall 54 and a bracket 112, which is rigidly supported on one of the vertical frame members 28 of the bale case. Thus, by rotating the shaft 105 through the sprocket 107, the feeder arm 90 is swung about the axis of the shafts 96, 105 continuously, during operation.

The outer end of the feeder 90 is provided with a pair of laterally spaced bearing sleeves 115, fixed rigidly to the ends of the arms 91, respectively. A feeder fork 116 is supported in the bearing sleeves 115, and comprises a transverse shaft 117 journaled in the axially aligned bearing sleeves 115, and a pair of crop engaging tines or fingers 118, which extend from a pair of spring coils 119 encircling the shaft 117 and fixed thereto by bolts 120. A tucker arm 121 is carried in offset relation on a supporting arm 122 fixed to the shaft 117, the tucker arm 121 as well as the fingers 118 being adapted to engage the crops as they are carried rearwardly on the platform 25 by the chains 69 and feed the crops over the floor plate 56 into the feeder opening 52.

The angle of the feeder fork 116 relative to the feeder arm 90 is controlled by means of a connecting rod 125, on one end of which is mounted a bearing sleeve 126 which is journaled on a pin 127 carried on an arm 128, which is fixed to the fork shaft 117. The opposite end of the connecting rod 125 carries a journal bearing 130, which is journaled on the shaft 98 at the upper end of the arm 100.

Figures 4, 5:
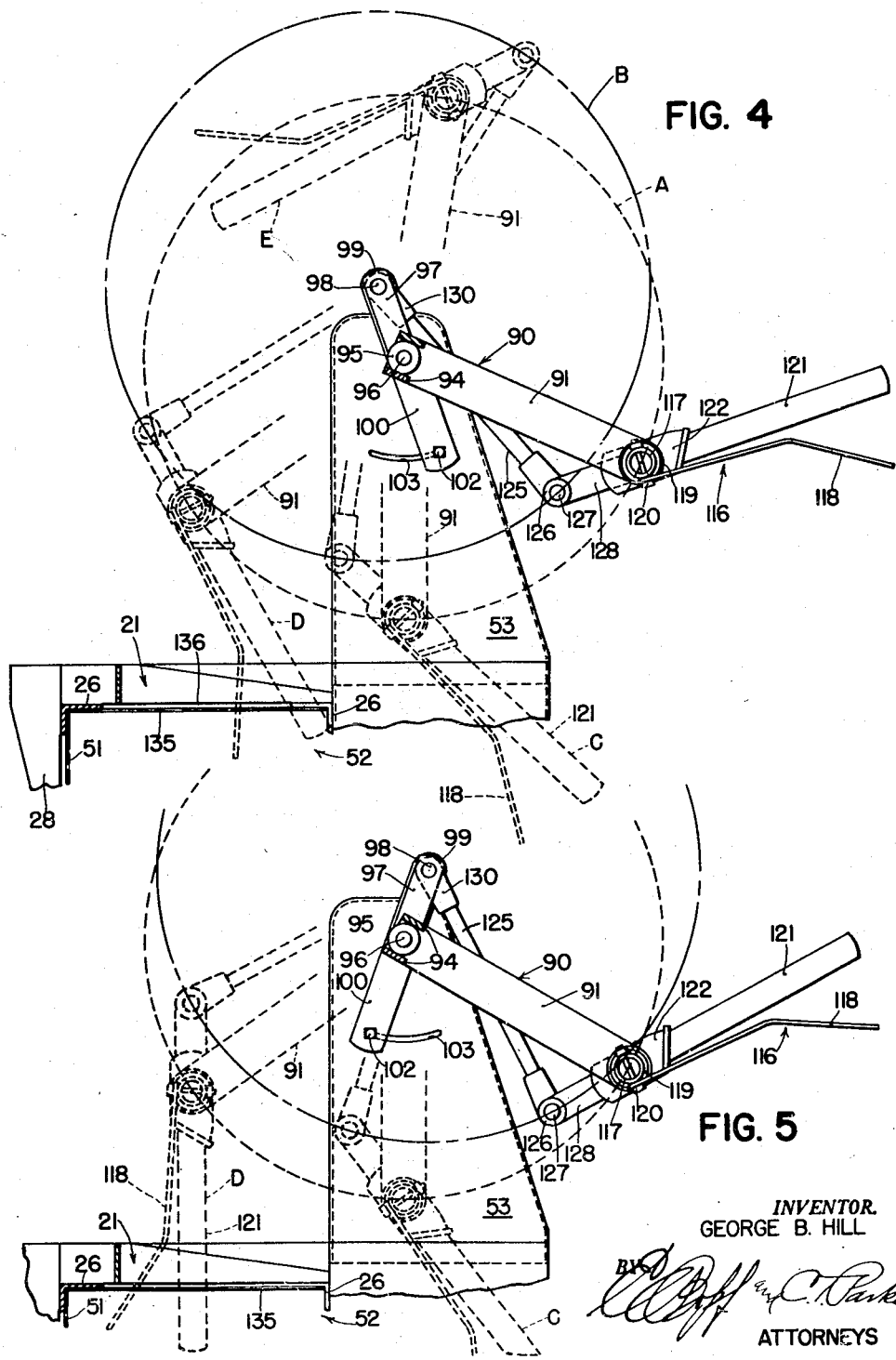
Figure 4 is a sectional elevational view taken through the feeding mechanism and the bale case along a line 4—4 in Figure 1, showing, in broken lines, various positions of the feeder in its cycle of movement, and drawn to an enlarged scale.
Figure 5 is a sectional view similar to Figure 4 but showing the feeder in another position of adjustment, in which the feeder fork travels through a greater portion of the width of the bale case.

Referring more particularly to Figures 4 and 5, it will be observed that as the feeder arm 90 swings in a circle about the axis of the shaft 96, the axis of the fork shaft 117 describes a circular arc about the axis of the supporting shaft 96, as indicated by the dotted line A. Since the axis of the shaft 98 is spaced from the axis of shaft 96, the outer end of the connecting rod 125, which is pivotally connected to the arm 128, describes a circular path about the axis of shaft 98, as indicated by the broken line B. Inasmuch as the arcuate paths A, B of the feeder fork shaft 117 and the pivot connection 127 between the connecting rod 125 and control arm 128, are offset from each other, the angle between the fork 116 and the feeder arm 90 changes continually throughout the cycle of movement. As shown in solid lines, the feeder fork 116 is moving downwardly over the platform and the fork is, at the same time, rotating in a clockwise direction about the axis of the shaft 117, until the feeder fork reaches its lowermost position substantially as indicated in dotted lines in position C, in which the lower ends of the fingers 118 are swinging over the floor plate 56. As the feeder arm 90 continues its movement upwardly, the connecting rod 125 is approximately parallel to the feeder arm 91 with the result that the feeder fork 116 is carried upwardly in a generally vertical position and is retracted lengthwise from the crop material within the bale case 20, thus avoiding entanglement with the crop material. In position D the arm is nearly withdrawn from the crop material within the bale case 20 and continues upwardly to the position indicated by E, in which the feeder fork 116 begins to rotate at accelerated speed in a clockwise direction about the axis of the shaft 117, the ends of the tines 118 swinging over the end of the arm 90 and into the position indicated in solid lines.

In Figure 4 the adjusting arm 100 is swung forwardly to the limit of its extent of movement in a counterclockwise direction, with the securing bolt 102 moved to the forward end of the slot 103. In Figure 5, the arm 100 is swung to its limit of clockwise movement about the axis of the bolt 101 until the securing bolt 102 reaches the rear end of the slot 103. Inasmuch as the shaft 98 on which the connecting rod 125 is journaled is moved forwardly from the position shown in Figure 4 to the position shown in Figure 5, the lowered position of the feeder fork, indicated at C in Figure 5 is farther to the rear than the corresponding position in Figure 4 and hence the feeder fork travels over a greater portion of the width of the bale case 20 and is retracted therefrom in a position substantially closer to the back wall 51 of the bale case 20.

The arm 100 can be set in any position of adjustment between the two extreme positions shown in Figures 4 and 5 by merely loosening the bolt 102 and swinging the arm 100 to the desired position. When the crop material is fed at a low rate by the platform conveyor chains 69 to the feeder fork 116, it is desirable that the feeder fork travel farther into the bale case 20 in order to distribute the crop material across the width of the bale case and closer to the back wall 51, rather than to merely carry the material to the feeder opening 52 and retract from the material at that point. However, on the other hand when the material is fed at a faster rate by the conveyor chains 69, such as when the windrows are thick and heavy, it is obvious that the feeder fork 116 engages a much larger mass of material, and at this time it is desirable that the fork should not travel as far across the bale case as in the previous instance. Hence, by setting the control arm 100 more nearly in the position indicated in Figure 4, the feeder fork can be retracted from the mass of material near the feeder opening 52 and thus does not crowd the heavy mass of material back against the rear wall 51, with the result that a better distribution across the bale case is thereby obtained.

A top plate 135 covers the bale case behind the feed opening 52 and extends from the front to the rear angle members 26. The top plate is provided with fore and aft extending slots 136 to receive the fork tines 118 and tucker arm 121 as they swing across the bale case, and the upper front angle member 26 is also slotted at these points. Reenforcing bars 137 are rigidly fixed, as by welding, to the top plate 135 and structural member 26 along each side of each slot 136 and are spaced apart by a spacing member 138 interconnecting the bars 137 at the rear ends of the slots 136. The bars 137 continue rearwardly and are joined to the vertical braces 28 on the rear of the bale case.

Extending forwardly from the top of the bale case across the feeder opening 52 is a guide sheet 145 provided with longitudinally extending slots 146 disposed in fore and aft alignment with the slots 136 in the top of the bale case, for the purpose of receiving the fingers 118 and tucker arm 121 of the feeder fork 116, which project downwardly through the slots 146. The guide sheet 145 in curved forwardly and upwardly in order to compress the crop material fed to the feeder opening 52 by the conveyor chains on the platform 25. The guide sheet 145 also prevents material from entangling with the feeder arm 90 and with the connecting rod 125. The forward end of each slot 146 increases in width in order to insure that the fingers 118 do not interfere with the sheet 145, in case the fingers become slightly bent. The sheet 145 is mounted on a structural frame 147 and the forward end of the frame 147 is supported by upwardly and rearwardly inclined bracing members 148.

The upper ends of the side walls 53, 54 are braced against lateral displacement by laterally and downwardly inclined braces 149, the outer ends thereof being secured to the bale case.

The crops are held down on the conveyor chains 69 by means of a presser wheel 150 which is journaled on an axle 151 supported between a pair of arms or links 152, which extend forwardly in diverging relation and are pivotally connected by bolts 153 to the arched bracing member 86 across the forward end of the platform. The weight of the presser wheel 150 is sufficient to maintain the crops in engagement with the chains 69, the wheel being free to swing upwardly to ride upon the top of the crops on the platform during operation. When there are no crops on the platform, the wheel rides on the center chain 69 and continues to be rotated by the lugs 70 of the chain 69 engaging the wheel, but the weight of the latter is carried on a pair of chains 154 which extend upwardly and are connected to the transverse member of the frame 147. The details of construction of the wheel itself do not form a part of the present invention, but are disclosed and claimed in application, Serial No. 442,256, filed May 8, 1942, by Hill and Jones, now Patent No. 2,394,996, granted February 19, 1946 to which reference may be had for a detailed description.

Figure 2:
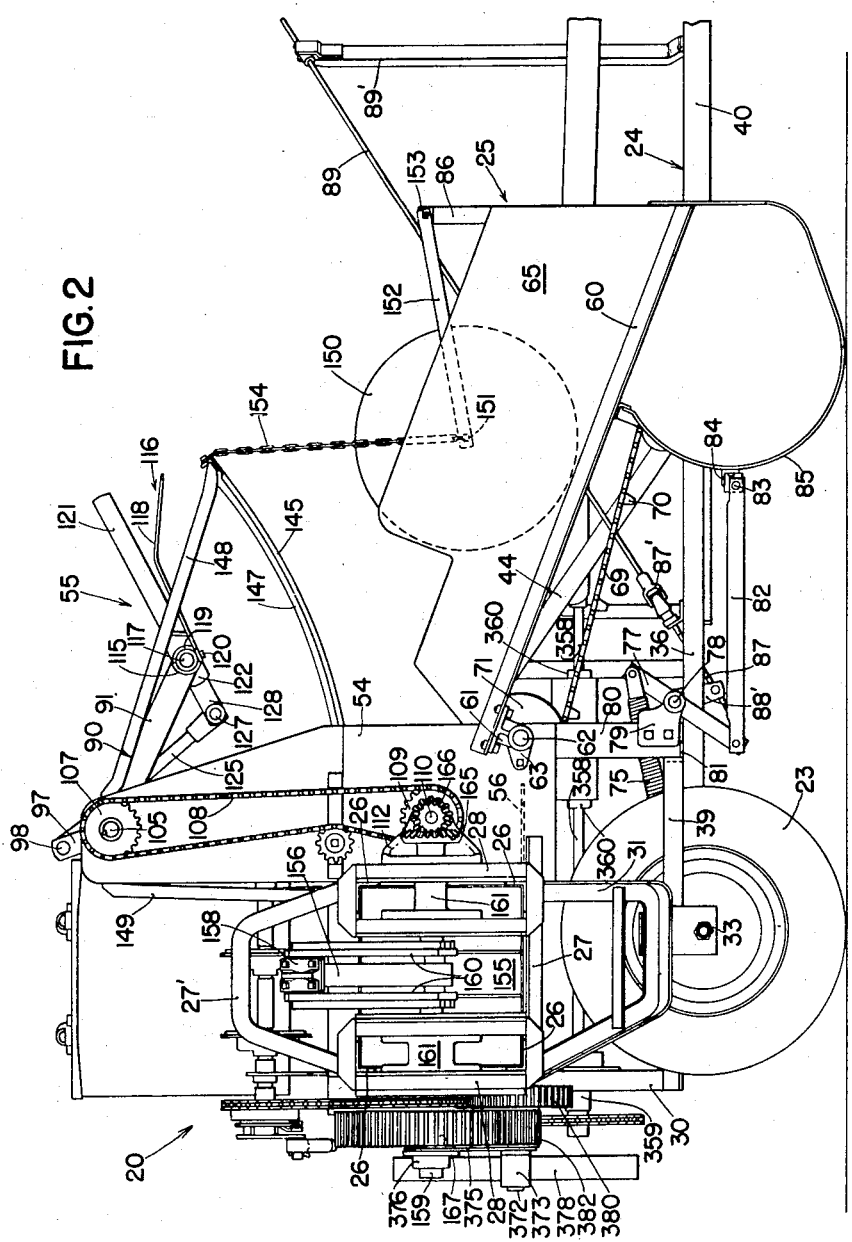
Figure 2 is a side elevational view of the right side of the machine.
Figure 3:
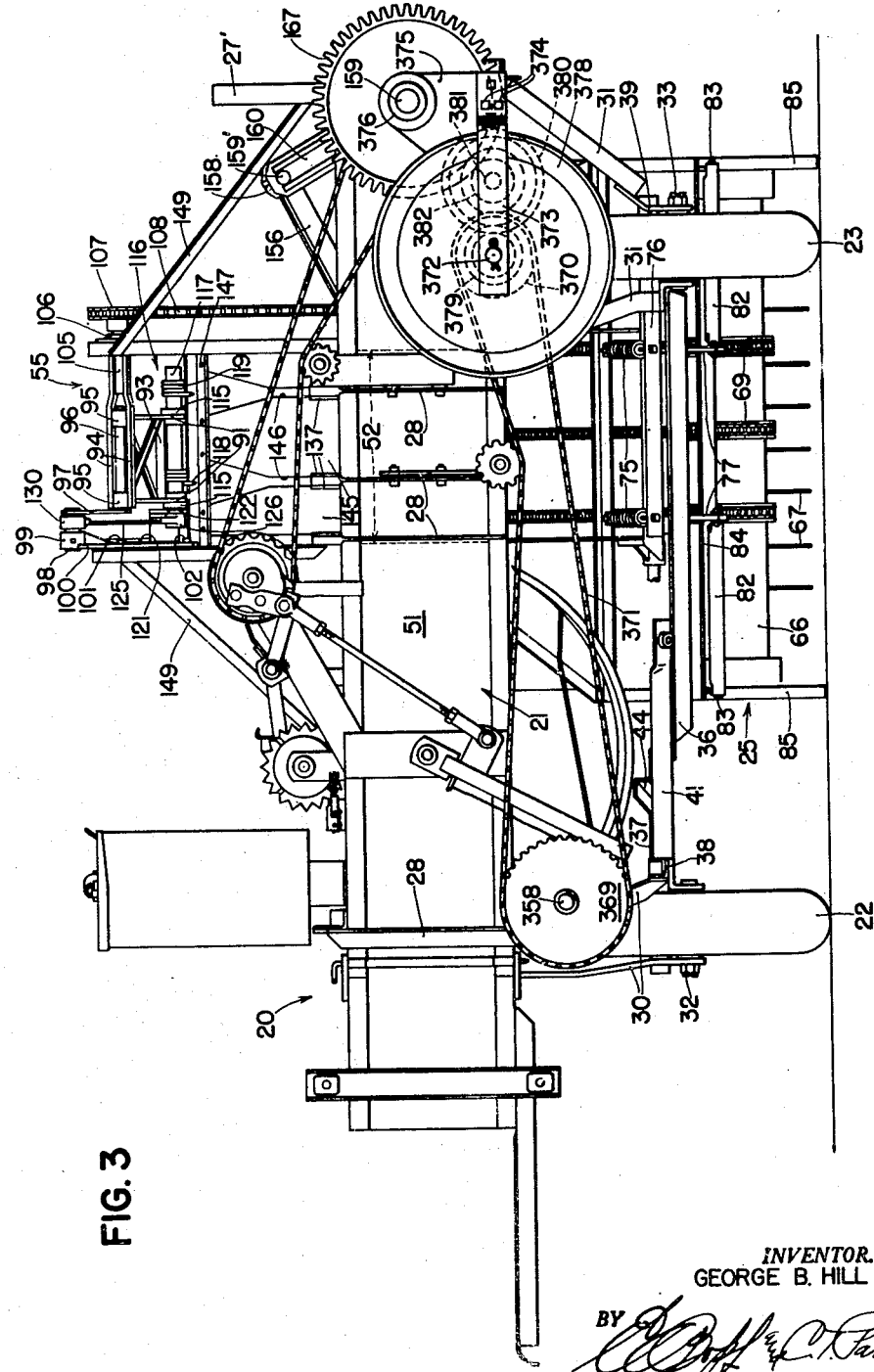
Figure 3 is a rear elevational view.

Slidably disposed within the bale case 20 is a plunger comprising a head 155 and a connecting rod 156 connected to the head 155 by a suitable wrist pin 157. The other end of the connecting rod 156 carries a connecting rod bearing 158, within which is journaled a crank of a crankshaft 159. The crank 159' (Figure 3) is carried on a pair of crank arms 160. The crank shaft 159 is journaled in a pair of axially spaced bearings 161, each of which is mounted on the frame of the bale case. The front and rear portions of the bale case are interconnected by a fore and aft extending frame member 27' which arches over the path of movement of the crank, as best shown in Figure 2. The crankshaft 159 extends beyond the front and rear sides of the bale case and carries a bevel gear 165 on the forward end thereof, which meshes with a bevel gear 166 fixed to the end of the shaft 110, through which gears power is transmitted for driving the shaft 110 and therefore the feeder arm 90. A bull gear 167 is mounted on the rear end of the crankshaft 159. The bull gear 167 is rotated continuously by power transmitting means to be described later, thereby rotating the crankshaft 159 at a substantially constant rate of speed to reciprocate the plunger head 155 laterally within the bale case past the feed opening 52 to compress the crop material in the bale case at the opposite side of the feed opening. In this respect, the baling press operates in a conventional manner, gradually forcing the formed bale toward the left of the machine as material is compressed therein.

After each bale is formed, it is tied by suitable tying mechanism, the details of which do not constitute an essential part of the present invention except as they cooperate with other mechanism as described in my copending application. The tying mechanism can be of the type which places a wire binding about the bale, or it can be a twine tying mechanism.

Power is supplied for driving the various elements of the machine, through a power shaft 355 extending longitudinally along the draft frame 24 and having a suitable flexible power transmitting connection 356 of any conventional type, for connecting the power shaft 355 with the power take-off shaft of a tractor. The power shaft 355 is connected through a universal joint 357 with a drive shaft 358 mounted on the draft frame of the implement and which extends rearwardly beneath the bale case and is journaled in a plurality of bearings 359, 360, which are mounted on the wheel support frame 30 and on a U-shaped frame member 361 on the draft frame 24. The pick-up mechanism is driven from the shaft 62, as has been previously explained, which is connected through a universal joint 362 to a transverse shaft 363 journaled in a bearing 364, which is carried on the U-shaped frame member 361. A bevel gear 365 on the end of the shaft 363 meshes with a drive pinion 366, which is fixed to the drive shaft 358, from which power is obtained. The rear end of the last mentioned shaft carries a sprocket 369, which is connected through a chain 371 to a sprocket 370, which is mounted on a stub shaft 372, the latter being supported at one end on the lower bale case member 26 of the rear of the bale case and is carried at its outer end on a cantilever beam 373. The beam 373 is rigidly bolted at 374 to a supporting plate 375 which supports the rear bearing 376 for the shaft 159 of the bull gear 167. The shaft 372 also carries a flywheel 378 rearwardly of the sprocket 370 and rigidly connected thereto, and a pinion 379 (see Figure 3), which meshes with a countershaft gear 380 fixed to a countershaft 381 which is supported between the lower bale case member 26 and the plate 375. A countershaft pinion 382 is fixed to the countershaft 381 and meshes with the bull gear 167 on the crankshaft 159. Thus, the crankshaft 159 and the plunger head 155 connected thereto, are driven from the power shaft 358 through the chain 371 and the train of gears. Since the flywheel 378 is mounted on a comparatively high speed unit including the sprocket 370, the flywheel can be much smaller than if it were mounted on the crankshaft itself. It has been previously explained that power for driving the feeder mechanism is also taken from the crankshaft through the pair of bevel gears 165, 166, shaft 110, and chain 108.

I do not intend my invention to be limited to the exact details shown and described herein, except as limited by the claims which follow.

I claim:

1. In a baling press, a bale case having a feed opening in one wall thereof, a plunger reciprocable within said case past said opening, a wall of said case perpendicular to said opening having a transverse slot extending inwardly from the opening, a feeder for moving material into said opening including tine means reciprocably mounted adjacent said case by means providing for movement through said opening into said slot, across said bale case, and retracting from the latter through said slot, and drive means for said plunger and feeder synchronized to avoid interference therebetween.

2. In a baling press, a horizontal bale case having a feed opening in a vertical wall thereof, a plunger reciprocable within said case past said opening, one of the horizontal walls of said case being slotted transversely from said opening, a feeder for moving baleable material into said bale case through said opening including at least one generally vertically disposed tine and means for reciprocably moving said tine toward said opening into a slot in said slotted wall, across a portion of said bale case and retracting from the latter through said slot, and drive means for said plunger and feeder synchronized to avoid interference therebetween.

3. In a baling press, a bale case having a feed opening in one wall thereof and a slot in an adjacent wall extending transversely from one end of said opening, and a feeder for moving baleable material through said opening into said bale case including tine means movably mounted for travel in a closed path toward said opening into said slots in said adjacent wall, across a portion of said bale case, retracting from the latter through said slot and returning outside of said case to a position in front of said opening.

4. The combination set forth in claim 3, including the further provision of a tucker arm associated with said tine means and movable therewith into the slot in said case adjacent one side of said opening, serving to clear material from that side of the feed opening.

5. In a baling press, a horizontal bale case having a feed opening in a vertical wall thereof and a slot in an adjacent horizontal wall extending transversely from one edge of said opening, a plunger reciprocable within said case past said opening, a feeder for moving baleable material through said opening into said case including generally vertically disposed tine means and a tucker arm mounted for travel in a closed path toward said opening into said slot, across a portion of said bale case, retracting from the latter through said slot and returning outside of said case to a position in front of said opening, said tucker arm being disposed for movement adjacent the side of said opening adjacent the bale being formed to clear material from that side of the opening ahead of said plunger, and drive means for said plunger and said feeder, synchronized to prevent interference therebetween.

6. The combination set forth in claim 3, including the further provision of means for adjusting the path of said feeder to control the extent of travel of the latter across and within said bale case.

7. In a baling press including a bale case having a feed opening in one wall thereof and slot means in an adjacent wall extending transversely from one end of said opening, a feeder for moving baleable material through said opening into said bale case, comprising an arm swingably mounted at one end for rotation about an axis substantially parallel to said bale case, a crop engaging member swingably mounted on the other end of said arm for angular movement relative thereto about an axis substantially parallel to the axis of swinging movement of said arm, and control mechanism for controlling the angular relation between said member and said arm during rotation of the latter, said mechanism being adapted to maintain said member in extended crop engaging relation as the member is swung toward said feed opening into said slot means in said adjacent wall and across said bale case, and shiftable to cause said crop engaging member to be retracted longitudinally from said bale case through said slot means.

8. In a baling press including a bale case having a feed opening in one wall thereof and slot means in an adjacent wall extending transversely from one end of said opening, a feeder for moving baleable material through said opening into said bale case, comprising an arm swingably mounted at one end for rotation about an axis substantially parallel to said bale case, a crop engaging member swingably mounted on the other end of said arm for angular movement relative thereto about an axis substantially parallel to the axis of swinging movement of said arm, said member being movable by rotation of said arm toward said feed opening, into said slot means in said adjacent wall, across said bale case and retracted outwardly through said slot means, and control mechanism for controlling the angular relation between said member and said arm during rotation of the latter, said control mechanism comprising link means connected to said crop engaging member and pivotally mounted for swinging movement about an axis spaced from and parallel to said axis of rotation of said arm, and means for shifting the pivot mounting of said link means to adjust the path of movement of said crop engaging member through said bale case.

9. A feeder mechanism of the class described, comprising a support, an arm swingably mounted on said support by means providing for rotation about an axis passing through one end thereof, a finger member swingably mounted on the other end of said arm by means providing for relative angular movement about an axis substantially parallel to said axis of rotation, and control mechanism for controlling the angular relation between said member and said arm during rotation of the latter comprising link means pivotally connected at one end to said member and pivotally connected at the other end to said support by pivot means disposed in spaced relation to said axis of rotation.

10. A feeder as described in claim 9, including the further provision of means for adjustably shifting said pivot means for said control link relative to said axis of rotation to change the path of movement of said finger member during rotation of said arm.

11. A feeder mechanism of the class described, comprising a support, an arm swingably mounted on said support by means providing for rotation about an axis passing through one end thereof, a finger member swingably mounted on the other end of said arm by means providing for relative angular movement about an axis substantially parallel to said axis of rotation, and control mechanism for controlling the angular relation between said member and said arm during rotation of the latter, comprising a link pivotally connected at one end to said member, an adjusting lever pivotally mounted on said support substantially coaxial with said axis of rotation, means for pivotally connecting the other end of said link to said adjusting lever at a point spaced from said axis, and means for securing said lever to said support in various positions of angular adjustment about said axis to adjust the path of movement of said finger member during rotation of said arm.

12. In combination, a baling chamber having a feed opening in a vertical side, a baling plunger mounted for reciprocation in the baling chamber, a packer element adapted to move material through the feed opening into the baling chamber, and means mounting the packer element for movement into the baling chamber through the feed opening in the vertical side and out of the baling chamber through the top thereof, said mounting means comprising a rotatable member having an axis of rotation above the baling chamber, means pivotally mounting the packer element on the rotatable member at a point spaced from its axis of rotation, and means for causing the packer element to have a relatively large angle of movement about its pivot on the rotatable member for a given angle of movement of the rotatable member when the pivot of the packer element is above the axis of rotation of the rotatable member and to have a relatively small angle of movement about its pivot on the rotatable member for the same given angle of movement of the rotatable member when the pivot of the packer element is below the axis of rotation of the rotatable member.

13. In a baling press including a bale case having a feed opening in one wall thereof and slot means in an adjacent wall extending transversely from one end of said opening, a feeder for moving baleable material through said opening into said bale case, comprising an arm swingably mounted at one end for rotation about an axis substantially parallel to said bale case, a crop engaging member swingably mounted on the other end of said arm for angular movement relative thereto about an axis substantially parallel to the axis of swinging movement of said arm, said member being movable by rotation of said arm toward said feed opening, into said slot means in said adjacent wall, across said bale case and retracted outwardly through said slot means, and control mechanism for controlling the angular relation between said member and said arm during rotation of the latter, said control mechanism comprising link means connected to said crop engaging member and pivotally mounted for swinging movement about an axis spaced from and parallel to said axis of rotation of said arm.

GEORGE B. HILL.

REFERENCES CITED

The following references are of record in the file of this patent:

UNITED STATES PATENTS

| Number | Name | Date |
|---|---|---|
| 1,028,404 | Trabue | June 4, 1912 |
| 1,756,988 | Nichols | May 6, 1930 |
| 2,293,679 | Barker | Aug. 18, 1942 |
| 2,355,645 | Haase | Aug. 15, 1944 |

FOREIGN PATENTS

| Number | Country | Date |
|---|---|---|
| 20,349 | Denmark | July 3, 1915 |